United States Patent [19]
Freeman et al.

[11] Patent Number: 5,968,018
[45] Date of Patent: Oct. 19, 1999

[54] CELL SEPARATION DEVICE AND IN-LINE ORIFICE MIXER SYSTEM

[75] Inventors: Abigail Freeman, Fremont; Gerald G. Fuller, Palo Alto; David H. Sierra, Atherton; Stanley R. Conston, San Carlos, all of Calif.; Alan S. Michaels, Chestnut Hill, Mass.

[73] Assignee: Cohesion Corporation, Palo Alto, Calif.

[21] Appl. No.: 08/741,233

[22] Filed: Oct. 30, 1996

[51] Int. Cl.⁶ .................................................. A61M 37/00
[52] U.S. Cl. ............................................. 604/191; 604/82
[58] Field of Search ................... 604/82, 83, 85, 604/181, 187, 191, 903

[56] References Cited

U.S. PATENT DOCUMENTS

| | | | |
|---|---|---|---|
| 3,586,064 | 6/1971 | Brown | 141/1 |
| 3,654,925 | 4/1972 | Holderith | 128/272 |
| 3,746,216 | 7/1973 | Frederick | 604/82 X |
| 3,780,935 | 12/1973 | Lukacs et al. | 233/1 |
| 3,800,947 | 4/1974 | Smith | 210/117 |
| 4,021,352 | 5/1977 | Sarstedt | 210/359 |
| 4,057,499 | 11/1977 | Buono | 210/136 |
| 4,142,668 | 3/1979 | Lee | 233/1 |
| 4,359,049 | 11/1982 | Redl et al. | 128/218 |
| 4,631,055 | 12/1986 | Redl et al. | 604/82 |
| 4,735,616 | 4/1988 | Eibl et al. | 604/191 |
| 4,818,386 | 4/1989 | Burns | 210/26 |
| 4,828,716 | 5/1989 | McEwen et al. | 210/740 |
| 4,874,368 | 10/1989 | Miller et al. | 604/82 |
| 4,877,520 | 10/1989 | Burns | 210/94 |
| 4,978,336 | 12/1990 | Capozzi et al. | 604/82 |
| 4,979,942 | 12/1990 | Wolf et al. | 604/83 |
| 5,116,315 | 5/1992 | Capozzi et al. | 604/82 |
| 5,286,257 | 2/1994 | Fischer | 604/82 |
| 5,308,506 | 5/1994 | McEwen et al. | 210/745 |
| 5,328,462 | 7/1994 | Fischer | 604/82 |
| 5,393,674 | 2/1995 | Levine et al. | 436/177 |
| 5,456,885 | 10/1995 | Coleman et al. | 422/101 |
| 5,464,396 | 11/1995 | Barta et al. | 604/191 |
| 5,474,540 | 12/1995 | Miller et al. | 604/191 |

*Primary Examiner*—John D. Yasko
*Attorney, Agent, or Firm*—Pennie & Edmonds LLP

[57] ABSTRACT

A fluid separation device and in-line orifice mixer system is disclosed. The fluid separation device utilizes a syringe, which is used for obtaining a fluid sample such as blood, in a centrifugation device, and further utilizes the syringe as a source of a separated fluid portion for storage and transfer for subsequent applications. The syringe containing the separated portion source and a second syringe containing a second source are connected to the in-line orifice mixer device. The mixer device comprises a plurality of orifice walls each providing an orifice non-aligned with adjacent orifices to homogeneously mix the plurality of components. The mixer device may further comprise an exit orifice wall with one or more orifices for discharge of the homogeneous mixture.

18 Claims, 3 Drawing Sheets

CELL SEPARATION DEVICE AND IN-LINE ORIFICE MIXER SYSTEM

FIELD OF THE INVENTION

The present invention generally relates to a syringe-based fluid separation and mixing system, however, various components of the invention may be used apart from the system as described herein. More specifically, the present invention relates to a method and apparatus for centrifugation using a single syringe for obtaining a biological or other fluid sample and separating suspended flocculents therefrom. An example of such an application is using the syringe to obtain a blood sample and to separate plasma and cells. In the preferred embodiment, the syringe containing the separated plasma may be used alone or in a dual syringe apparatus with an in-line orifice mixer system whereby a plurality of components can be homogeneously mixed and then expelled from a single apparatus.

BACKGROUND OF THE INVENTION

The process of obtaining a biological or other fluid sample such as blood and the subsequent centrifugation process generally requires multiple steps and devices, including the transferring of the sample from the syringe used to obtain the sample to a separate centrifugation syringe. These steps increase the overall inconvenience, costs, and time necessary to perform the procedure by requiring handling by medical personnel and the sterilization and use of multiple devices. In addition, risks of contamination of the sample and/or infection of the medical personnel are increased as the amount of handling and the number of devices used are increased.

The application of the separation and mixing system described below uses, merely as an example, blood as the fluid sample. After a centrifugation process of blood, separated plasma may be mixed with a coagulation solution from another syringe into a mixer. The resulting multi-component mixture can be used as a mixed tissue adhesive for seamlessly or seam-supportingly connecting human or animal tissue or organ parts, for sealing wounds, stopping bleeding and the like. For applications such as sealing cerebrospinal fluid leakage, a very high degree of homogeneity of the multi-component mixture is desirable and often necessary due to high pressure transients. Thorough mixing of sealant components is desirable to maximize strength of the polymerized sealant. However, prior art mixers generally do not achieve a sufficient level of mixing in a fast enough time, especially where the viscosity ratio between the two components is relatively high.

A common prior art mixer is a helical mixer whose primary type of flow is a shear flow. An example of a similar method for mixing multi-part compositions is disclosed in U.S. Pat. No. 5,328,462 to Fischer, which utilizes the rotation of a mixer element within a syringe barrel to mix components.

After mixing the components, the mixture is then discharged from the mixer. Most prior art and commercial pressure nozzles are of the swirl-type that must first produce a centrifugal velocity on the mixture immediately prior to its being discharged from the exit orifice. The prior art helical mixer accomplishes this by forcing the mixture into a swirl chamber, sending the mixture through spiral channels, and imparting a circular motion superimposed onto the axial velocity of the mixture. Thus, a helical mixer or a separate swirling mechanism must be used to effect the swirl-type method of discharging the mixture.

SUMMARY OF THE INVENTION

In view of the above problems and disadvantages of the prior art, it is an object of the present invention to provide a single apparatus for blood withdrawal and centrifugation in order to decrease handling by medical personnel, to reduce risks of contamination, and to reduce the number of devices necessary for the process in order to minimize costs.

It is a further object of the present invention to provide a method of achieving a more homogenous mixing of components with a relatively high viscosity ratio than that achieved by the shear flow induced by prior art mixers.

It is yet a further object of the present invention to provide a method of ejecting the multi-component mixture without the use of a helical mixer or a separate swirling mechanism.

The separation and mixing system of the present invention is described herein in terms of utilizing blood as the fluid sample. However, other biological and non-biological fluid samples may readily be used in the separation and mixing system as will be apparent to those skilled in the art.

The centrifugation syringe and in-line orifice mixer system of the present invention comprises a single apparatus for blood withdrawal and cell separation and a second apparatus for a more homogeneous mixing of a multi-component substance. Specifically, a standard syringe preferably containing an anticoagulant is used to withdraw blood and then the needle is removed from the syringe. The syringe is then fitted into a cell separator and placed into a centrifuge and centrifuged. After centrifugation, the separated plasma remains in the syringe with the syringe serving as a source of plasma in the in-line orifice mixer system.

The orifice mixer system of the present invention comprises a syringe assembly which accommodates one or more syringes, each containing a source for a component of the multi-component mixture. The syringe assembly is attached to a manifold such as a Y connector which is in turn attached to the in-line orifice mixer and nozzle. With the orifice mixer system, a medical personnel can simultaneously force a protein solution from one syringe and a coagulation solution from another syringe into the in-line orifice mixer. A homogeneously mixed multi-component substance such as a tissue adhesive or biological sealant would then exit the orifice mixer and nozzle.

The in-line orifice mixer comprises a plurality of orifice plates each providing one or more orifices. The orifice mixer is advantageous in that it generates a high extensional and low rotational fluid flow and subjects the fluid to continual reversals in the extension direction resulting in repeated alternating extensional and compressional flow. Specifically, in an orifice mixer, extensional flow is generated as fluid is accelerated from a relatively large cross-sectional area of a region before an orifice plate through the constriction of an orifice. After passing through an orifice, the fluid experiences a region of compressional flow. Thus, an extensional flow is created at an orifice entrance and a compressional flow is created at an orifice exit region, resulting in the desirable repeated alternating extension-compression flow. As a result, an orifice mixer can achieve a more homogeneous mixing of a plurality of components, even where the components have a relatively high viscosity ratio.

One method of delivering the mixture from the mixer of the present invention to a target area is to eject the mixture through a spray nozzle. An alternative to the swirl-type spray nozzle is preferred and an elliptical or noncircular orifice spray nozzle is one such alternative. Due to the nonuniform stresses caused by a noncircular orifice, atomization may occur without a swirl chamber. However, a fan-shaped, conical, rather than circular, spray would result. Thus, if a sheet spray is acceptable, a simple, noncircular exit orifice can be used that would avoid the need of a swirl section. One embodiment of the present invention provides an elliptical orifice preferably disposed in the center of the last orifice plate of the orifice mixer to serve as an elliptical spray nozzle. Alternatively, the last orifice plate may provide multiple orifices and/or orifices of other shapes, such as slots. Nonspray methods of delivering the mixture from the mixer to a target area may also be used, such as by attaching the mixer to one end of a cannula, catheter, or endoscopic device.

DETAILED DESCRIPTION OF THE INVENTION

Figure 1:
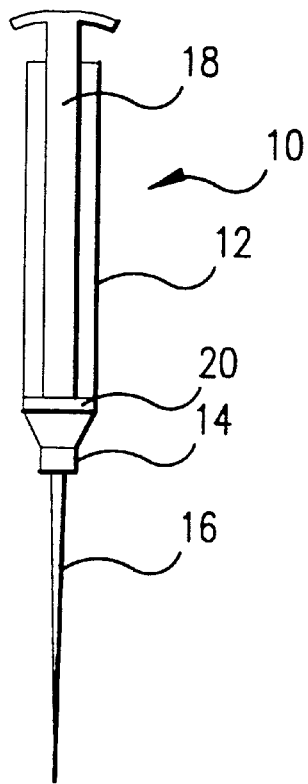
FIG. 1 is a side view of a standard syringe.

As shown in FIG. 1, a standard syringe 10 for use with the present invention includes syringe body 12, needle fitting 14, needle 16, handle 18, and plunger 20. Syringe 10 operates in a known manner to draw a blood sample from a patient. Preferably, syringe 10 contains an anticoagulant such as sodium citrate, heparin or EDTA.

Figure 2:
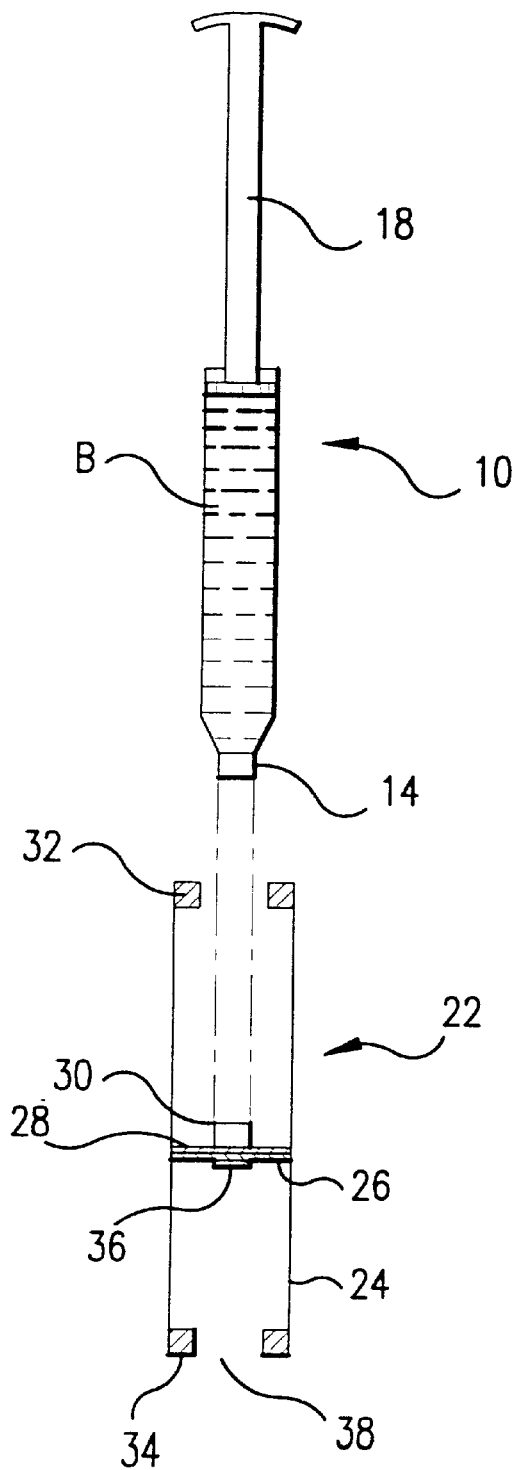
FIG. 2 is a partial cross-sectional view of a cell separator with the syringe of FIG. 1 before centrifugation, according to a preferred embodiment of the present invention.

Referring to FIG. 2, standard syringe 10 has been used to draw blood sample B from a patient and the blood sample is contained therein. Needle 16 has been removed and syringe 10 is ready to be placed into cell separator 22 by guiding syringe 10 along syringe guide members 32 and by mating needle fitting 14 with syringe fitting 30. Alternatively, tubular body 24 may be dimensioned such that syringe guide members 32 are not necessary to guide syringe into cell separator 22. Fitting 30 is mounted on fixed barrier 28 within tubular body 24. Fitting 30 permits passage of cells through the fixed barrier and into a cell space 33 (see FIG. 3) which is created when moveable plunger 26 of separator 22 moves downward during centrifugation. Mating fittings 14 and 30 may be selected from commercially available fittings. Cell separator 22 can be conveniently made by modifying a standard syringe (larger in size than syringe 10) according to the teachings contained herein. Syringe handle 18 may be removed depending on the requirements of the centrifugation device to be used.

Figure 3:
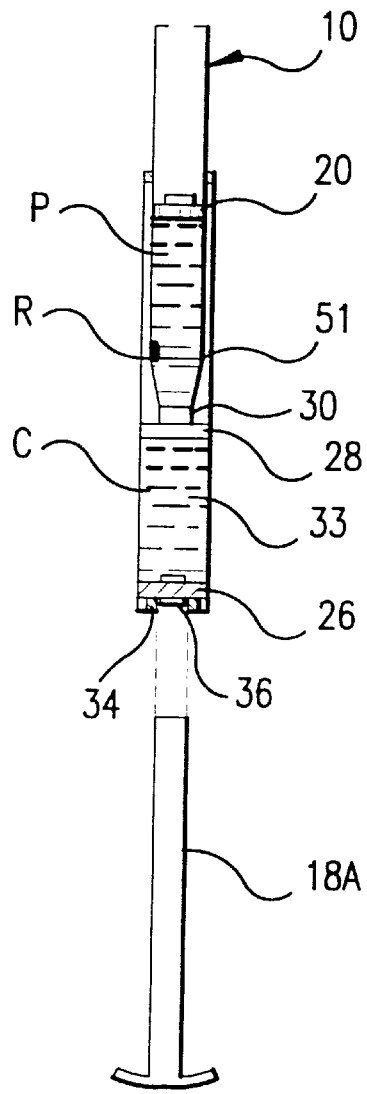
FIG. 3 is a partial cross-sectional view of the cell separator of FIG. 2 after centrifugation.

After assembly, as shown in FIG. 3, the syringe-cell separator assembly is then placed into the centrifugation device and centrifuged. During centrifugation, heavier cells C separate and move through syringe fitting 30 into cell space 33 defined between fixed barrier 28 and movable plunger 26. Simultaneously, both syringe plunger 20 and movable plunger 26 of separator 22 travel by centrifugation force toward stop members 34. Stop members 34 are positioned to control the volume of material which passes through syringe fitting 30 into cell space 33 during centrifugation in order to prevent loss of plasma. The final volume of cell space 33 thus can be controlled as desired to obtain particular results in different applications.

After centrifugation, plasma P remains in syringe body 12. Syringe 10 can then be removed from syringe fitting 30. In addition, syringe handle 18 may be reattached to syringe 10 to remove plasma P from syringe body 12. In order to remove cells C for use in other applications, additional handle 18A may be attached to fitting 36 on plunge 26 to permit expulsion of the cells through fitting 30. Alternatively, cells C can remain captive within cell separator 22 which may be discarded with minimal risk of contamination to the medical personnel.

Figure 4:
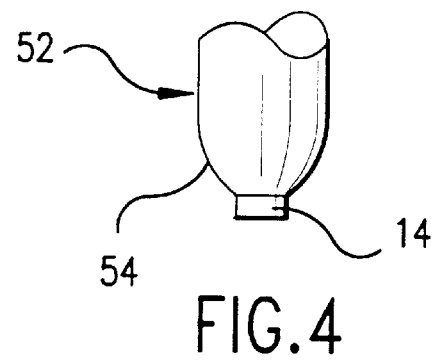
FIG. 4 depicts an alternative syringe body end.

Standard syringes frequently include a relatively sharp interior corner 51 in syringe body 12 where diameter of body 12 decreases from that of syringe plunger 20 to that of needle fitting 14. The sharpness of interior corner 51 can cause a residual deposit of cells R after cell separation by centrifugation, as shown in FIG. 3. In applications where residual deposit of cells R may be undesirable, alternative syringe end 52, as shown in FIG. 4, may be used. Alternative syringe end 52 provides a continuous gradient resulting in a gently curved syringe body wall 54 leading to needle fitting 14 to eliminate the corner where cells may tend to stick.

Figure 5:
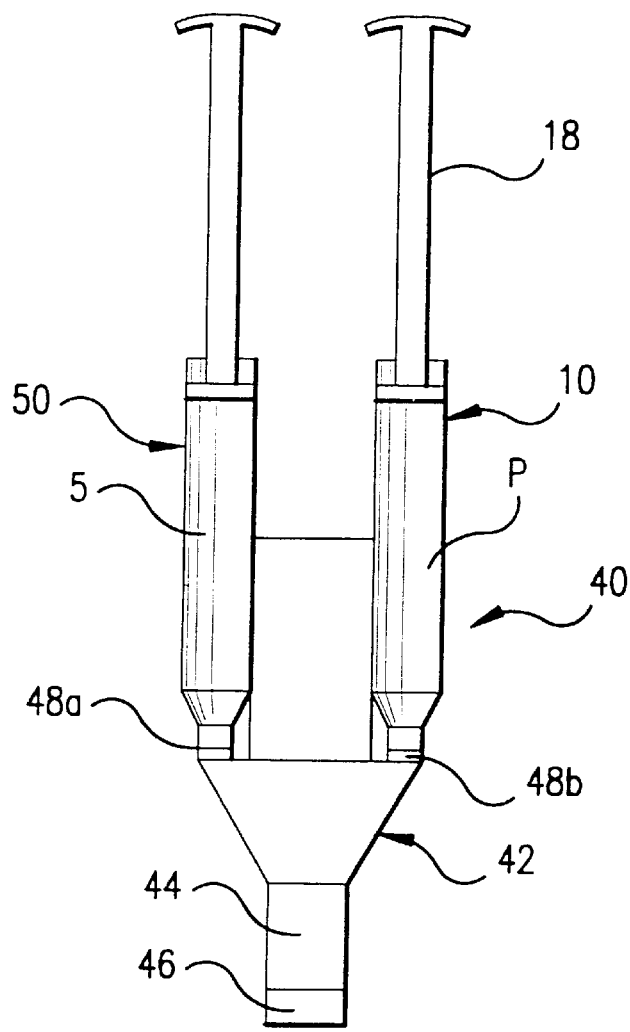
FIG. 5 is a side view of a dual syringe mixer assembly, according to a preferred embodiment of the present invention.

As shown in FIG. 5, syringe 10 containing plasma P may be placed in dual syringe applicator 40 by attaching needle fitting 14 to a manifold, such as Y connector 42, at syringe fitting 48a. Second component syringe 50 can be similarly attached to Y connector 42 at syringe fitting 48b. Examples of second components are calcium ion, thrombin, or other procoagulants. In a preferred embodiment, second component S is a thrombin-collagen component which, when properly mixed with plasma P, creates a bio-compatible adhesive. Y connector 42 connects the outlets of syringe 10 and second component syringe 50 to the inlet 56 of orifice mixer 44. Thus, plasma P and second component S are simultaneously forced through Y connector 42 into orifice mixer 44 via mixer inlet 56. The dual syringe Y-connector and various associated fittings thus far described are known components which may be configured by a person of ordinary skill in the art. For purposes of brevity, the discussion contained herein is principally directed to the use of two-component systems. Nevertheless, it is easily understood by one skilled in the art that the methods 8 apparatus of the present invention can accommodate systems with more than two components.

Orifice mixer 44, according to the present invention will be described in greater detail. As previously discussed, common prior art helical mixers primarily induces shear flow. The shear flow is composed of an equal proportion of two basic flow types: elongational or extensional flow and rotational flow. It is the extensional flow component which causes component mixing by effecting fluid droplet deformation and break-up. In contrast, the rotational flow component inhibits droplet deformation by rotating an extended droplet into a state of compression. Where the two components to be mixed have a relatively large viscosity ratio, as in the case of the high viscosity collagen composite material and the low viscosity plasma, use of a shear flow may be ineffective in producing the desirable high level of droplet break-up and mixing. Therefore, in contrast to a shear flow, a flow that is minimally rotational and highly extensional would be more efficient and effective in achieving mixing of components with a high viscosity ratio.

In addition, subjecting the fluid mixture to continual reversals in the extensional direction resulting in repeated alternating extensional and compressional flow can greatly improve the rate of droplet break-up and mixing. Such repeated alternating extension-compression amplifies droplet break-up and mixing as it serves to extend, fold, and break fluid filaments. Accordingly, orifice mixer 44 of the present invention simultaneously produces a minimally rotational highly extensional flow as well as a repeated alternating extension-compression flow.

Figure 7:
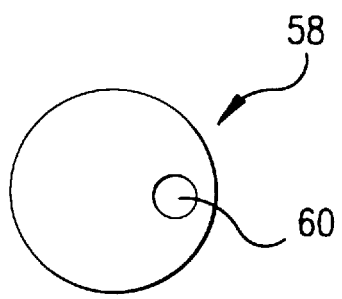
FIG. 7 is a top view of an orifice plate of the in-line orifice mixer of FIG. 6.
Figure 8:
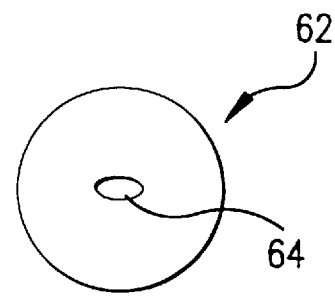
FIG. 8 is a top view of an exit orifice plate of the in-line orifice mixer, according to the preferred embodiment of the present invention.
Figure 9:
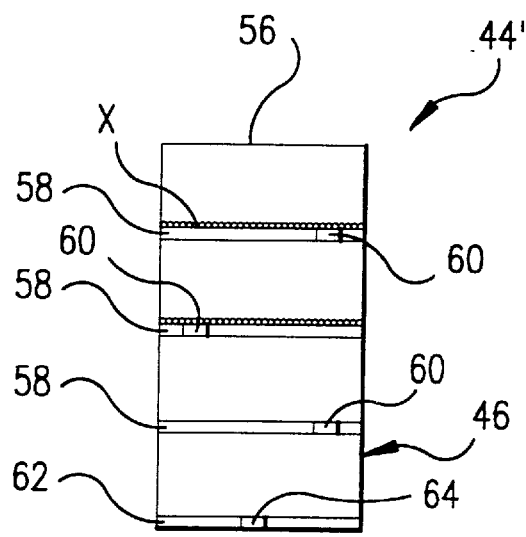
FIG. 9 is a cross-sectional view of an in-line orifice mixer according to an alternative embodiment of the present invention.

Referring to FIGS. 7 and 8, orifice mixer 44 contains a plurality of orifice plates 58, each disposed a distance from one or more adjacent orifice plates. For example, orifice mixer 44 may be a stainless steel syringe coupling (luer lock design) comprising a tube of inner diameter 4.3 mm and length 7 mm. Each orifice plate 58 provides one or more orifices 60. Orifice plates 58 may be plastic with different orifice sizes such as 0.5 mm, 0.75 mm, and 1.0 mm. Orifice plates 58 may be integrally formed, such as by injection molding, so that orifice plates 58 are interconnected by one or more coupling members (not shown) along edges of orifice plates 58. Orifice plates may then be placed within mixer 44 such that the coupling members are along length of mixer 44. Orifice plates 58 may also be separately formed. Alternatively, a portion-of each orifice plate 58 may be integrally formed with a portion of body of mixer 44 such that two or more of the plate-body portions combine to form mixer 44.

Orifice 60 may be located at the center of orifice plate 58 or offset from the center by, for example, 1 mm, depending on plate size. Preferably one or more of the orifices 60 of each orifice plate 58 do not align with the one or more adjacent orifices 60 of the one or more adjacent orifice plates 58. Non-alignment of orifices 60 avoids channeling of the mixture from one orifice to the next. As components P and S are forced through orifice plates 58, components P and S are mixed, resulting in a homogenous mix of tissue adhesive.

Figure 6:
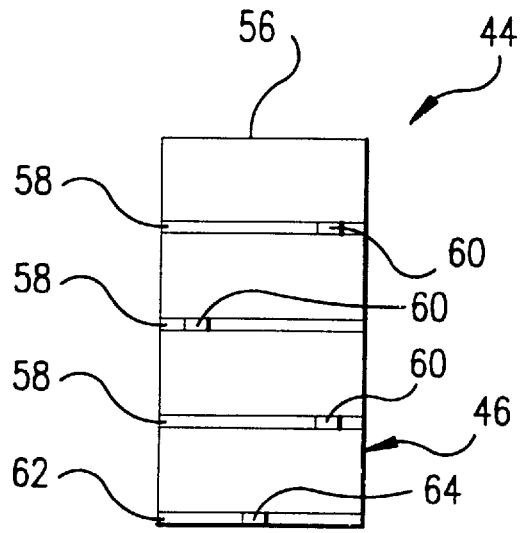
FIG. 6 is a cross-sectional view of an in-line orifice mixer according to the invention.

As shown in FIGS. 6 and 8, orifice mixer 44 may also contain exit nozzle 46. Exit nozzle 46 contains exit orifice plate 62 with one or more elliptical exit orifice 64. Thus, a homogeneous mix of components P and S is forced through exit orifice 64 and exits exit nozzle 46 in an aerosol or near-aerosol form. The elliptical shape of the orifice is preferred for use with the orifice plate mixer due to the lack of spiral motion of the mixed fluid. Alternative embodiments of exit orifice plate 62 (not shown) provides multiple exit orifices and/or exit orifices of other shapes, such as slots. Alternatively, orifice mixer 44 may be placed at one end of a cannula, catheter, or endoscopic device in order to deliver a homogeneous mix of components P and S from orifice mixer 44 to a target area.

In an alternative embodiment shown in FIG. 9, one or more orifice plates 58 are coated with a third component X, and thus orifice mixer 44' can also serve as a source of component. As a result, when the first component is forced from syringe 10 through orifice plates 58, component X, miscible and soluble with component P, is quickly mixed into component P. Substances which may be useful as component X include catalysts, crosslinkers such as activated multifunctional polyethylene glycol (PEG), therapeutic agents such as antibiotics and therapeutic growth factors, or other biomaterials that may be suspended or dissolved into a flowable form. In yet another alternative embodiment, one or more orifice plates 58 can be made of a catalytic material or modified to be catalytic in order to initiate polymerization. In these embodiments, it may be desirable to utilize syringe 10 with mixer 44' alone where the only additional component to be mixed with the first component is compatible with such an application. In this case, mixer 44' may be adapted to mate directly with needle fitting 14.

Although various embodiments of the present invention have been described, the descriptions are intended to be merely illustrative. Thus, it will be apparent to those skilled in the art that modifications may be made to the embodiments as described without departing from the scope of the claims set forth below. In particular, the various components of the invention described herein may be used separately or apart from other components, or in different combinations, without departing from the invention.

What is claimed is:

1. An in-line mixer for homogeneously mixing fluid components, comprising:

a body member, wherein the body member has a length and an inlet for receiving at least one component fluid; and a plurality of at least substantially parallel, orifice defining, walls disposed inside the body member generally transverse to the direction of fluid flow and spaced along the length of the body member;

wherein each orifice defined by said walls is non-aligned relative to orifices of adjacent walls.

2. The in-line mixer according to claim 1, wherein said walls are separate members placed within said body member.

3. The in-line mixer according to claim 1, wherein said orifice defining walls are integrally formed in a one piece element.

4. The in-line mixer according to claim 1 wherein at least one orifice defining wall is coated with a material mixable with fluid passing through the mixer.

5. The in-line mixer according to claim 1 wherein at least one orifice defining wall is made of a catalytic material capable of initiating polymerization with fluid passing through the mixer.

6. The in-line mixer according to claim 1, further comprising a wall defining one or more exit orifices at an end of the body member, wherein said wall is at least substantially parallel to said orifice defining walls.

7. The in-line mixer according to claim 6, wherein at least one of the one or more exit orifices is elliptical.

8. The in-line mixer according to claim 1, wherein a catheter is placed at one end of the body member.

9. A method for homogeneously mixing a multi-component mixture, comprising subjecting said mixture to alternating compressional and extensional flows by forcing said components to flow together through a series of walls each wall having at least one orifice therein, wherein said walls are separated by mixing chambers, and wherein each orifice is non-aligned relative to the orifices in adjacent walls.

10. The method according to claim 9, further comprising the step of creating at least a partial aerosol by discharging the mixed components through one or more exit orifices.

11. The method according to claim 10, wherein at least one of the one or more exit orifices is elliptical.

12. An in-line mixer for homogeneously mixing at least two fluids, comprising:

a plurality of mixing chambers connected in series, each chamber being defined by a bottom wall and a side wall, wherein each said bottom wall has at least one orifice therein, and wherein a first chamber is configured to receive said at least two fluids.

13. The in-line mixer according to claim 12, wherein said at least one orifice in the bottom wall of adjacent mixing chambers do not align.

14. The in-line mixer according to claim 13, wherein a last chamber of said plurality of mixing chambers communicates with a spray nozzle which substantially atomizes the mixed fluid.

15. The in-line mixer according to claim 13, wherein said at least one orifice of the bottom wall of a last chamber of said plurality of mixing chambers is an ellipse.

16. A method for homogeneously mixing a multi-component mixture, comprising:

forcing said components through a plurality of mixing chambers connected in series, said chambers being defined by a side wall and a bottom wall, said bottom wall having at least one orifice therein, wherein the fluids are accelerated from a relatively large cross-sectional area of a mixing chamber before an orifice and decelerated after passing through a relatively small cross-sectional area of said orifice into the adjacent mixing chamber.

17. The method according to claim 16, further comprising the step of substantially atomizing the mixed components by discharging the mixed components through one or more exit orifices.

18. The method according to claim 16, further comprising the step of substantially atomizing the mixed components by discharging the mixed components into a spray nozzle wherein said spray nozzle substantially atomizes the mixed components.

* * * * *